United States Patent Office 3,806,480
Patented Apr. 23, 1974

3,806,480
ESTERS OF MELAMINE RESINS
David P. Leonard, Overland Park, Kans., assignor to Cook Paint & Varnish Company, Kansas City, Mo.
No Drawing. Filed Oct. 26, 1971, Ser. No. 192,659
Int. Cl. C08g 9/32
U.S. Cl. 260—24
4 Claims

ABSTRACT OF THE DISCLOSURE

A solid acid ester of hexamethoxy methylol melamine for use in powder coating compositions.

---

The present invention is concerned with certain solid esters of melamine resins and their use in powder coating compositions.

Considerable work is being done at the present time to develop effective powder coating compositions since such compositions may be applied without the use of volatile organic solvents or vehicles and the resultant disadvantages, environmental and otherwise. Normally powder coatings are applied by electrostatically spraying a resinous fusible film-forming powder on a substrate and then baking to fuse the powder into a continuous film. To accomplish this the resins used must have a certain melting point and flow characteristics, i.e. they must be able to fuse to form a continuous film in heating, but at ambient temperature they must be free-flowing i.e. not cake or fuse into a solid mass.

Melamine resins are well known materials for use in coating compositions and, as a general rule, they have been found to have a number of particularly advantageous features when so used. However, most melamine resins are liquids or very low melting solids and therefore have found only restricted use in the field of powder coating.

The present invention is based on the finding that certain esters of methylol melamines can be prepared which are solid at ambient temperature up to, for example 80–90° C. or higher, and have the advantageous melting point and fuse properties which make the esters uniquely useful for powder coating applications. More specifically, it has been found possible to esterify hexamethoxy methylol melamine with acids such as benzoic acid or rosin acid to obtain a solid melamine resin which may be ground up into a fine non-caking, free-flowing powder which can be used to make a coating composition suitable for electrostatic spray applications or the like.

The esterification reaction which is involved in preparing the said melamine esters of the invention may be represented as follows, using benzoic acid as the acid reactant:

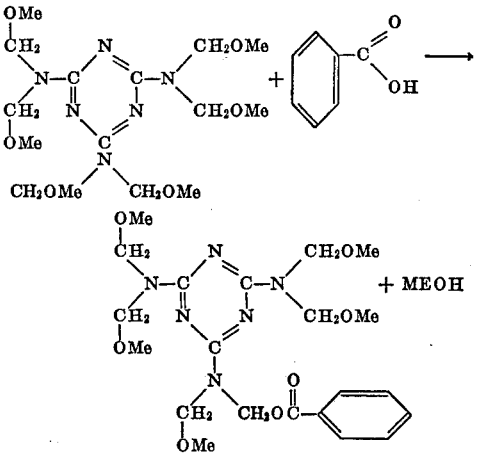

where Me represents the methyl radical.

While the esterification has been described above using one mol of each reactant it will be appreciated that two or more mols of the acid may be used so as to replace a plurality of the Me groups, although it is preferred that at least two of the Me groups of the hexamethoxy methylol melamine be retained after the esterification so that the product will effectively cross-link into a cured film.

Benzoic acid, butylbenzoic acid and rosin acid are the preferred acids for use herein. However, the monofunctional monocyclic or polycyclic aryl acids, e.g. lower alkyl benzoic acids other than butylbenzoic, cinnamic acid or naphthenic acid, may be used. The relative proportions of acid (or mixtures thereof) and hexamethoxy methylol melamine can be varied as indicated above, and will depend on such factors as, e.g. the nature of the materials to be blended therewith in completing the coating formulation, the desired baking temperature and the like.

Conventional esterification conditions, as well known in the art, may be used to make the solid esters of the invention. Usually it is sufficient to simply mix the two reactants together while heating sufficiently to distill off methyl alcohol by-product. A carbon dioxide flush may be used to facilitate removal of the alcohol and it is preferred to condense the alcohol as it is removed in order to observe how the reaction is proceeding. An esterification catalyst may be used, if desired, but it is usually not necessary.

A solvent is not necessary in the esterification since the hexamethoxy methylol melamine and the acid are both easily stirred fluids at reaction temperatures, e.g. 150–190° C. or higher. However, an inert hydrocarbon solvent may be used if desired. Advantageously, the reaction is carried out by simply heating the reactants together with stirring and removal of methanol until the reaction mixture has an acid number of up to 15, usually in the range of 10–15. The reaction product is then cooled, granulated or powdered and blended with an appropriate cross-linking resin, e.g. a hydroxy or acid functional polyester, oil-modified alkyd and/or hydroxy or acid functional acrylic, in particulate form. Blending may be accomplished in any convenient manner as will be appreciated. If desired, the solid ester and cross-linking resin may be granulated together rather than in separate operations.

The particulate or powder coating compositions of the invention comprising the solid melamine ester and the cross-linking resin (usually in amounts such that the melamine ester comprises 5–50% by weight of the mixture) may be applied to any desired substrate by conventional electrostatic spray techniques with baking at 280–320° C. to give a cured continuous film, demonstrating outstanding hardness, flexibility and solvent resistance. Alternatively, the coating compositions may be applied by, for example, fluidized bed techniques wherein the substrate, heated to the desired temperature (280–320° C.), is inserted in the bed of particulate coating composition.

The invention is illustrated by the following examples wherein parts and percentages are by weight unless otherwise stated:

EXAMPLE 1

A 5 liter 3 necked flask was charged with 1,431 gr. of para-t-butylbenzoic acid and 1,569 gr. hexamethoxy methylol melamine (Cymel 303). Attached to a neck was a thermometer and $CO_2$ delivery tube. To a second neck was placed a Barrett trap and a vertical condenser. The mixture was heated with agitation and a light $CO_2$ blow until methyl alcohol started to distill off. The temperature was allowed to increase until a maximum of 190° C. was reached. The resin was then cooked until a 15 maximum acid number and D–F viscosity in Cellosolve acetate (60% nonvolatiles) were reached. The resin was then strained through cheesecloth, and cooled. The product was a brittle solid, acid number 13.6, melting point 82–87° C. (ball and ring) and 99±1% nonvolatile. The product was readily granulated into a powder for electrostatic spray applications with, for example, a hydroxy-functional polyester.

EXAMPLE 2

Example 1 was repeated using 46.5% (1.0 mol) wood rosin and 53.5% (1.0 mol) Cymel 303 to give a hard brittle solid (99±1% nonvolatiles) having an acid number 12.5; and a ball and ring melting point of 78–83° C.

EXAMPLE 3

Example 1 was repeated using 46.5% (1.0 mol) hydrogenated wood rosin (Staybellite rosin) and 53.5% (1.0 mol) Cymel 303 to give a brittle, solid ester (99±1% nonvolatiles) having an acid number of 10.8 and a ball and ring melting point of 73°–78° C.

EXAMPLE 4

The powdered product of Example 1 was blended in a 1:4 ratio with a hydroxy functional polyester and a small amount (0.1%) of catalyst (paratoluene sulphonic acid) and then electrostatically sprayed onto a steel substrate (e.g. an automobile body) followed by baking at 390° C. The particles were fused to give a cured continuous film that was highly resistant to solvents and showed excellent flexibility and hardness.

The hydroxy functional polyester used in this example was of conventional type comprising the reaction product of 12.80% (0.6 mol) trimethylolpropane, 26.90% (1.6 mol) neopentyl glycol, 7.20% (0.4 mol) caprolactone, and 53.10% (2.0 mol) isophthalic acid. This polyester was characterized by an acid number of 10, a ball and ring melting point of 93–99° C. and a visccosity in dimethylformamide (at 50% nonvolatiles) of D–F.

Similar results are obtainable with conventional types of alkyd resins or acid-modified polyesther resins as conventionally used in coating compositions. A typical acid functional polyester suitable for use herein is the product obtained by reacting together:

| | Percent |
|---|---|
| Trimethylolpropane | 7.54 (0.3 m.) |
| Dimethylolpropionic acid | 2.76 (0.11 m.) |
| Propylene glycol | 27.08 (1.89 m.) |
| Isophthalic acid | 62.49 (2.00 m.) |
| Catalyst: | |
| Stannous oxalate | .10 |
| Sodium acetate | .03 | and further characterized by an acid number of 25–30; a ball and ring melting point of 94–99° C. and a viscosity (50% nonvolatiles) in dimethylformamide of B–D. Another example is the hydroxy functional acrylic bead polymer obtained by polymerization of the following:

| | Percent |
|---|---|
| Water | 56.55 |
| Duponol ME | .01 |
| 5% Elvanol 5222 in water | .79 |
| $Na_2SO_4$ | .60 |
| Styrene | 8.40 |
| Methyl methacrylate | 2.00 |
| 2-ethyl hexylacrylate | 8.80 |
| Butyl methacrylate | 12.00 |
| Hydroxypropyl methacrylate | 8.80 |
| Acrylic acid | .80 |
| t-Butylperoctoate | .65 | to give a solid product having an acid number of about 16. Elevanol 5222 is polyvinyl alcohol and Dponol is a fatty alcohol sulfate dispersing agent.

While p-toluene sulphonic acid has been used above in Example 4 as the curing catalyst, it will be appreciated that other such catalysts may be used, e.g. polyacrylic acid. Normally, such catalysts will be used in the range of 0.1 to 0.5% based on the weight of resins, but it is also possible to operate effectively without a catalyst, especially where acid functional polyesters of relatively high acid number (e.g. 25–30) are used.

Additionally, it is noted that, while the solid esters of the invention are especially useful in connection with powder coatings, they may be dissolved in suitable solvents, e.g. ketones such as methyl isobutyl ketone, and used as such by application to a metal substrate in solution form with heating to remove the solvent and cure the ester. For example, highly useful metal coil coatings can be obtained by applying a solution of the product of Example 1 in methyl isobutyl ketone to the coils and heating to cure the ester resin. A cross-linking agent or curing catalyst need not be used and any of a variety of liquid vehicles or solvents may be used although alcohols or other liquids which might react with the ester should be avoided.

The scope of the invention is defined by the following claims wherein.

I claim:

1. A solid ester in powder form comprising an acid ester of hexamethoxy methylol melamine, said ester having the formula:

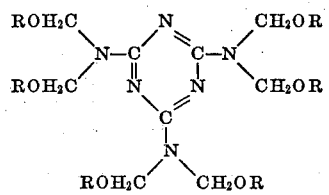

wherein R is selected from the group consisting of methyl and the radical

of a monofunctional acid $R_1$ COOH, said acid being selected from the group consisting of rosin acid, benzoic acid, lower alkyl benzoic acids, cinnamic acid and naphthenic acid, at least one of the R substituents being methyl and at least two of said R substituents being

2. An ester according to claim 1 wherein the acid is a rosin or benzoic acid and the ester has an acid number of up to 15.

3. An ester according to claim 2 wherein the acid number is in the range of 10–15.

4. A heat-curable powder coating composition comprising the ester of claim 1 and a solid cross-linking agent which is a hydroxy or acid functional polyesther, alkyd or acrylic resin capable of cross-linking with said ester on heating to give a cured continuous film.

References Cited

UNITED STATES PATENTS

| | | | |
|---|---|---|---|
| 3,306,865 | 2/1967 | Wheeler | 260—24 |
| 3,660,327 | 5/1972 | Loncini | 260—21 |
| 3,592,786 | 7/1971 | Swidler | 260—21 |
| 3,211,579 | 10/1965 | Reiter | 260—67.6 R |

DONALD E. CZAJA, Primary Examiner

W. E. PARKER, Assistant Examiner

U.S. Cl. X.R.

260—21, 23 R, 26, 33.6 UA, 67.6 R, 249.6, 850, 856